Aug. 6, 1940.　　　　C. T. McGILL　　　　2,209,993
MULTIPORT VALVE
Filed June 20, 1938　　　6 Sheets-Sheet 1

Inventor:
Chester T. McGill

Aug. 6, 1940.    C. T. McGILL    2,209,993
MULTIPORT VALVE
Filed June 20, 1938    6 Sheets-Sheet 4

Inventor:
Chester T. McGill
By
McCanna, Wintercorn & Morebeck
Attys

Aug. 6, 1940.  C. T. McGILL  2,209,993
MULTIPORT VALVE
Filed June 20, 1938    6 Sheets-Sheet 5

Inventor:
Chester T. McGill
By
McCanna, Wintercorn & Morsbach
Attys.

Aug. 6, 1940.  C. T. McGILL  2,209,993
MULTIPORT VALVE
Filed June 20, 1938   6 Sheets-Sheet 6

Inventor:
Chester T. McGill
By
McCanna, Wintercorn & Morsbach
Attys.

Patented Aug. 6, 1940

2,209,993

UNITED STATES PATENT OFFICE 2,209,993

MULTIPORT VALVE

Chester T. McGill, Elgin, Ill.

Application June 20, 1938, Serial No. 214,663

20 Claims. (Cl. 251—84)

This invention relates to new and improved multiport valves.

The principal object of my invention is to provide a multiport valve having longitudinally compressible and expansible tubular sealing elements at the various ports between the stator and an intermediate ported plate and between the intermediate ported plate and the rotor to provide water-tight connections between the rotor and stator in all predetermined operating positions of the rotor with respect to the stator, the one set of sealing elements being compressible when the intermediate plate is moved away from the rotor to permit rotation thereof from one operating position to another, and the other set of sealing elements being subjected to compression in the return of the intermediate plate to normal position.

Another important object of my invention is to provide a valve of the kind mentioned having molded rubber bellows serving as the sealing elements between the stator and the intermediate ported plate, permitting easier compression and expansion in the unseating and seating of the intermediate plate relative to the rotor, and insuring longer life and greater freedom from maintenance trouble and expense.

Still another important object of the invention is the provision of pipe connections in the circumferentially extending wall of the housing so as to permit elimination of a ported stator, the connections in the wall of the housing having communication with the ports in the intermediate plate through elbows in the ports of the movable plate and movable therewith, and flexible hose or bellows connections between the pipe connections and the elbows to permit unseating and seating movement of the intermediate plate relative to the rotor.

A further important object of my invention, where the invention is applied to a water softener valve, is the embodiment of the brine ejector in the valve itself, the ejector in accordance with the preferred embodiment of my invention being incorporated in the intermediate plate, the same having its nozzle chamber communicating with the brine tank and being arranged to have the nozzle thereof placed in communication with the water supply pipe when the rotor is turned to the brining position, the rotor at the same time closing off communication between the inside of the housing and the port which communicates with the nozzle chamber, so as to permit discharge of the brine from the valve to the softener.

These and other objects of the invention will soon appear as reference is made in the following specification to the accompanying drawings, in which—

Similar reference numerals are applied to corresponding parts throughout the views.

Referring first to Figs. 1 to 5, the numeral 16 designates generally the stator or body member of the valve on which the housing 17 is suitably secured compressing a gasket 18 therebetween to prevent leakage. A packing gland 19 at the center of the top wall of the housing 17 has the valve stem 20 reciprocable and rotatable therein and serves to prevent leakage. 21 is the rotor in which a plurality of holes 22 are provided on the same radius and in equally circumferentially spaced relation around the center thereof to permit extension of plungers 23 through the rotor from a cross-head 24 on the lower end of the valve stem 20 to unseat the intermediate plate 25 in relation to the rotor 21 while the rotor is being turned through the medium of the valve stem 20, cross-head 24, and plungers 23 from one operating position to another. A hand lever 26 is pivoted to the upper end of the stem 20, as at 27, and has an arm 28 received with a sliding working fit in the annular guide 29, so that downward movement of the hand lever 26 depresses the plate 25 against the action of coiled compression springs 30 disposed between the plate 25 and the stator 16, whereby to unseat the plate 25 relative to the rotor 21 to permit rotation of the latter to another position. When the lever 26 is swung downwardly, it is retracted from whichever retaining notch 31 it happened to be engaged in at the time, so that the lever may be swung sideways in either direction to turn the stem 20 and the rotor 21 with it. When the lever has been turned to bring it into register with another retaining notch, the rotor 21 is accordingly turned to a new position establishing a new system of port communication, whereupon the hand lever 26, if permitted to enter the registering notch, causes the valve to be reseated under the action of the springs 30 acting against the intermediate plate 25. It is, of course, understood that the annular guide 29 is provided between the ring 32 and the top of the yoke 33 onto which the ring is fastened, as at 34, and that the yoke 33 extends annularly with respect to the upper end of the stem 20 and has the notches 31 provided therein in circumferentially spaced relation with respect to the stem as a center. The yoke 33 is herein shown as formed integral with the arm 35 extending upwardly from the top of the housing 17 on one side of the stem 20.

The present invention is, of course, applicable to valves generally, although the valve herein disclosed is designed particularly for use in controlling the flow of fluids to and from a zeolite or base exchange water softener. The stator 16 has a central axial threaded opening 36 for connection with the raw water supply pipe, this opening communicating with the central port 37. A plurality of radial threaded openings numbered 38 to 41, are provided in the stator in equally circumferentially spaced relation for connection to pipes that conduct fluid into and out of the valve through the central port 37 and circumferentially spaced ports 42—46 in the top of the stator. Now, the rotor 21 has circumferentially spaced ports 47—49 provided therein arranged to come into register with the circumferentially spaced ports in the stator in different operating positions of the rotor. A hollow boss 50 on the rotor 21 interconnects the ports 48 and 49, and there is a passage 51 in the stator interconnecting the ports 43 and 44 so that they both communicate with the radial port 39.

The intermediate plate 25 has ports 52—56 in circumferentially spaced relation corresponding in size to and registering with the ports 42—46 in the stator, and it is through these ports that the ports in the rotor establish communication with the ports in the stator in the different operating positions of the rotor. Each of the ports 52—56 has a metallic bushing 57 entered therein with a press fit and projecting upwardly from the plate 25 to receive a tubular rubber seal 58 thereon fitting snugly around the bushing and projecting upwardly slightly beyond the upper end of the bushing to provide a yieldable seating and sealing surface 59 annularly with respect to the upper end of the bushing for cooperation with the bottom surface 60 on the rotor 21. Other tubular rubber seals 61 fit snugly around the lower projecting ends of the bushings 57 and extend downwardly from the bushings and are fitted snugly around the upper ends of other metallic bushings 62 entered in the stator ports in register with the bushings 57 but normally in slightly spaced relation thereto, as appears in Fig. 1. The tubular rubber seals 61 bear tightly at their upper ends against the bottom of the intermediate plate 25 and at their lower ends at the top of the stator 16, and it is obvious that the water pressure active on the outside of these sealing elements will tend to increase the tightness of their fit on the bushings 57 and 62. The tubular rubber seals 58 bear tightly at their lower ends against the top of the intermediate plate 25, and in this case also the water pressure active on the outside of these sealing elements tends to increase the tightness of their fit on the bushing 57, so that there is less danger of leakage. It is also evident that there is sufficient overlap between all of the tubular rubber seals and the bushings cooperating therewith to minimize danger of leakage.

Figure 1:
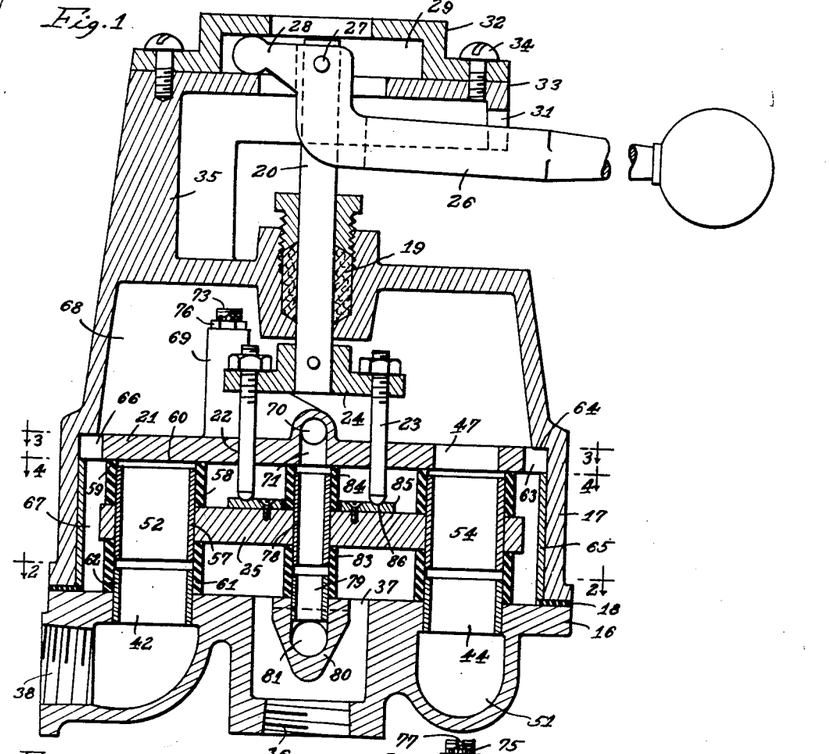
Fig. 1 is a vertical section through a multiport valve embodying my invention, the view being taken on the broken line 1—1 of Fig. 2.
Figures 2, 3, 4:
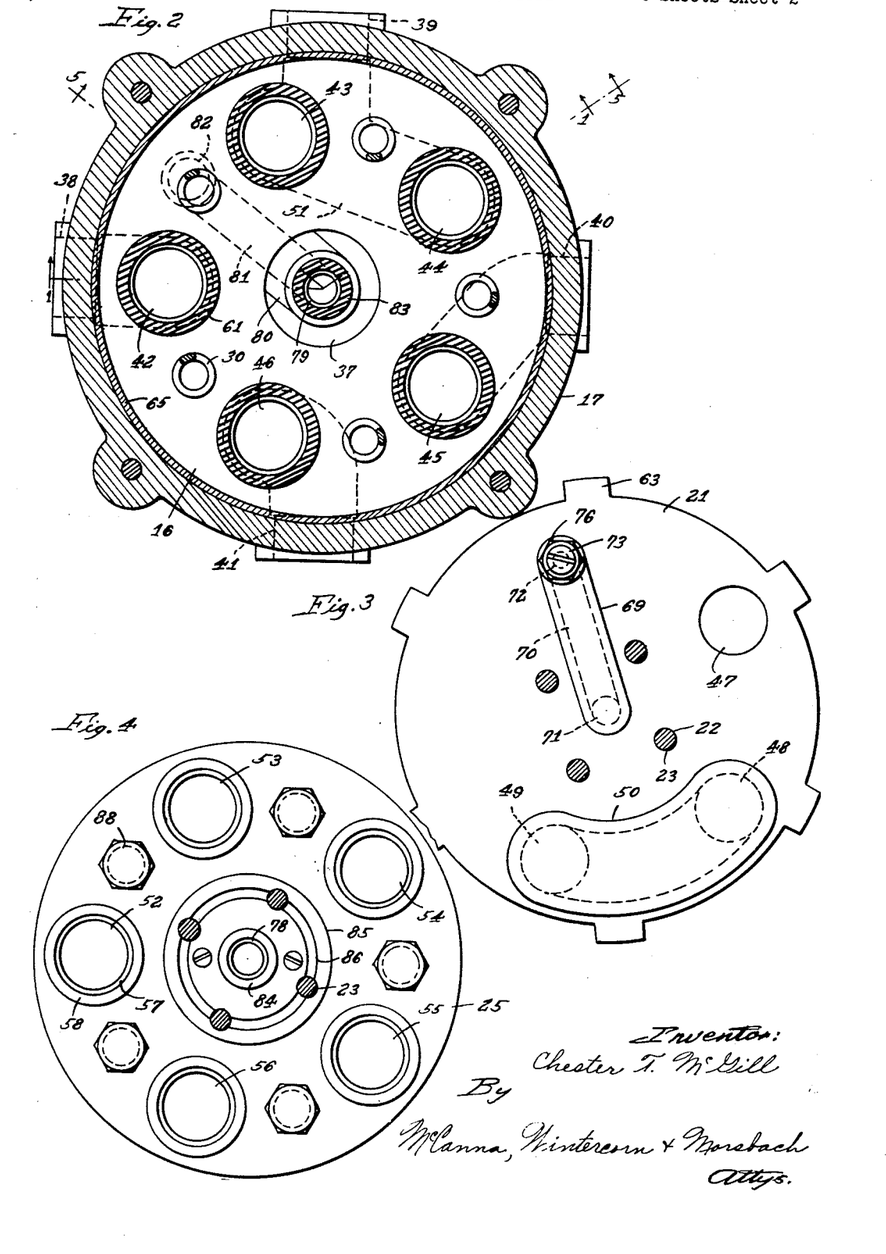
Fig. 2 is a cross-section on the line 2—2 of Fig. 1.
Figs. 3 and 4 are top views of the rotor and intermediate plate, respectively, these views being taken on the corresponding numbered lines of Fig. 1.
Figure 6:
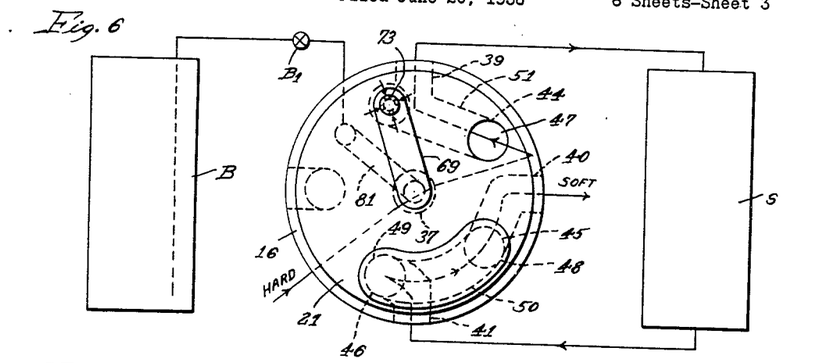
Figs. 6, 7, and 8 are diagrammatic views illustrating the operation of the valve as applied to a base exchange water softener.

The rotor 21 has a plurality of circumferentially spaced radial lugs 63 slidably engaged between an annular shoulder 64 on the inside of the housing 17 and the upper end of a sleeve 65 fitting inside the housing between the rotor and stator. In that way, the rotor is mounted for rotation in the housing while at the same time openings 66 are left around the rotor between the lugs 63, permitting free passage of fluid from the chamber 67 supplied from the port 37 to the chamber 68 above the rotor. The raw water supplied to chamber 68 is discharged through the port 47 in the rotor to whichever port in the stator happens to be in communication therewith. In the softening operation illustrated in Fig. 6, the raw water flows from port 47 in the rotor to port 44 in the stator and thence through passage 51 and radial port 39 into the top of the softener tank S. The softened water leaving the bottom of the tank S enters radial port 41 in the stator and flows through port 46 in the stator to the port 49 in the rotor and through passage 50 and port 48 in the rotor to the port 45 in the stator and out through the radial port 40 in the stator to the service system.

Figure 5:
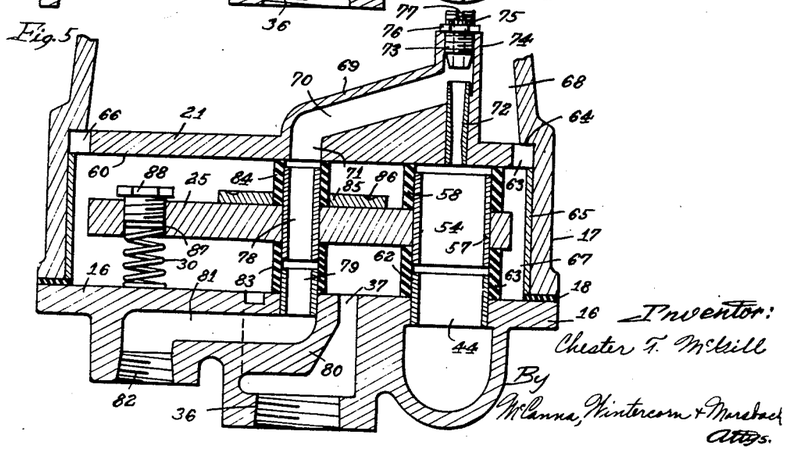
Fig. 5 is a fragmentary vertical section on the broken line 5—5 of Fig. 2.
Figure 7:
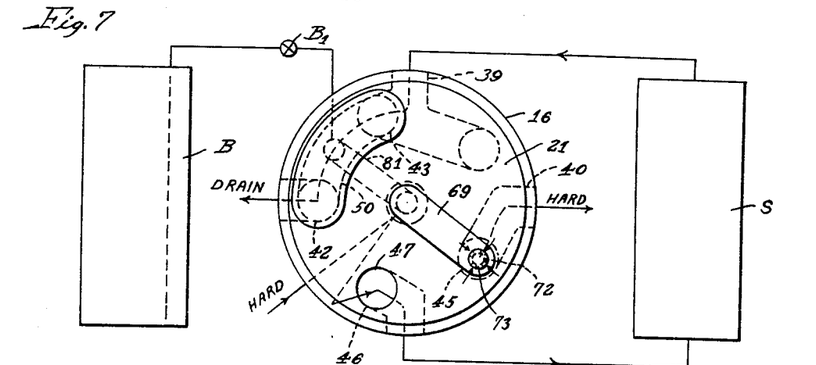
Figure 8:
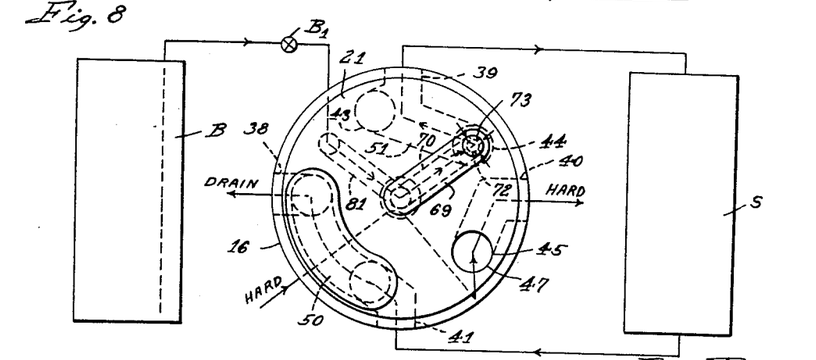

The rotor 21 has a radial boss 69 case integral therewith having a passage 70 extending from a central port 71 in the bottom of the rotor to the upper end of an ejector nozzle 72 mounted vertically in the rotor to discharge brine downwardly into whichever port in the stator communicates therewith. A jet 73 is threaded in a neck 74 provided on the boss 69 in concentric relation with the nozzle 72, and has a series of radial holes 75 through which water from the chamber 68 flows for discharge through the nozzle 72. An adjusting nut 76 threaded on the jet 73 above the neck 74 serves to lock the same in adjusted position and also regulates the amount of water discharged through the ejector nozzle, the jet being adjustable by means of a screw-driver entered in the slot 77. Brine is supplied to the passage 70 through a nipple 78 in the center of the intermediate plate 25 communicating with a nipple 79 in the center of the stator carried on a boss 80 projecting radially from one side of the port 37. A passage 81 provided in the stator extends radially from the center thereof to a threaded port 82 into which the pipe extending from the brine tank B (Figs. 6 and 8) is connected. A tubular rubber seal 83 fits on the lower projecting end of the nipple 78 and over the upper end of the nipple 79 which is normally in spaced relation to the nipple 78, as shown in Fig. 5. Another tubular rubber seal 84 fits around the projecting upper end of the nipple 78, and establishes fluid tight communication between the nipple 78 and the passage 70 when the intermediate plate 25 is seated. Preliminary to the regeneration of the water softener, the valve is shifted from the softening position of Fig. 6 to the backwash position shown in Fig. 7, and the incoming raw water is delivered through port 47 in the rotor to the stator port 46 and thence to the bottom of the softener tank S for flow upwardly through the bed to break up the bed and wash out from the top portion thereof accumulated sediment to the drain. The waste water from the top of the tank S enters the valve's radial stator port 39 and flows through the stator port 43 and passage 50 in the rotor to the stator port 42 which communicates with the sewer or other drain receptacle. During this brief backwash period, raw water may be supplied to the service system by reason of the communication of the ejector nozzle 72 and jet 73 with the stator port 45 which communicates through the radial stator port 40 with the service system. After the backwash flow, the valve is sifted again to the brining position shown in Fig. 8, and during this longer period of brining and rinsing, raw water is again supplied to the service system through the port 47 which in this instance communicates with the stator port 45 connected to the service system through the radial port 40. Brine is supplied simultaneously to the top of the softener tank S for flow downwardly therethrough, raw water being delivered through the jet 73 to the stator port 44 through the ejector nozzle 72 and causing brine to be entrained therewith for delivery into the top of the softener tank S through the stator passage 51 and radial stator port 39. The brine is supplied from the brine tank B through the valve B₁ which is opened only during the brining of the softener. The brine enters through stator passage 81 and flows through the rotor passage 70 to the ejector nozzle 72, at which point it is discharged with the raw water through the ejector nozzle 72 into the stator port 44. The brine in passing through the bed of water softening material releases the calcium and magnesium deposited in the mineral during softening, and the spent brine leaving the bottom of the softener tank S is discharged to the drain by entering the valve at the stator port 41 and flowing through the rotor passage 50 to the stator port 38 which communicates with the sewer or other drain receptacle. The brine flow is continued until the level in the brine tank drops to a predetermined point, whereupon the brine valve B₁ is closed and the raw water flow is allowed to continue so as to rinse out the brine from the bed of water softening material. When the outgoing water is found upon test to be soft, the flow can be discontinued and the valve shifted back to the softening position shown in Fig. 6 to resume softening operation. The brine tank B can then be refilled with water at any time by merely opening valve B₁, it being evident in Fig. 6 that water can be supplied through jet 73 and boss 69 to passage 81 leading to the brine tank.

In passing, it will be noticed that the plungers 23 for unseating the intermediate plate 25 from the rotor 21 have a ring 85 suitably secured on the top thereof having an annular groove 86 therein forming a track or raceway in which the rounded lower ends of the plungers 23 may slide easily in the turning of the rotor. The coiled compression springs 30 which normally urge the intermediate plate 25 toward the rotor 21 are held in place at their upper ends by engagement in holes 87 in the plate 25, plugs 88 being threaded into the holes 87 against the upper ends of the springs to provide abutments therefor, which, if desired, may be adjustable to vary the spring pressure active on the plate 25 to seat the same.

In operation, it should be clear from the description that the hand lever 26 can be moved downwardly to unseat the intermediate plate 25 without the application of much force, inasmuch as there is considerable leverage due to the close spacing of the pivot pin 27 to the annular guide 29, in relation to the distance from the pivot to the hand grip on the outer end of the handle. The five springs 30, however, exert appreciable pressure tending to keep the intermediate plate 25 seated on the rotor 21, and all of the tubular seals 58 and 84 are compressed endwise under this spring pressure sufficiently to eliminate danger of leakage. In the unseating of the plate 25 from the rotor, the tubular seals 61 and 83 are subjected to endwise compression, but the compression cannot become excessive, because, if the operator bears down too heavily upon the hand lever 26, the bushings 57 and nipple 78 will bottom on the bushings 62 and nipple 79, respectively. Inasmuch as the compression of the tubular seals 61 and 83 is limited in the manner described, and the tubular seals 58 and 84 are subjected to compression only under spring pressure, it is obvious that these seals should last indefinitely. The maintenance and service expense in the operation of this valve will accordingly be very low. It is believed to be obvious from the description of Figs. 6 to 8, of the softening, backwash, and brining operations, that three notches 31 will be sufficient for locking the valve in its various operating positions. The operator simply forces the hand lever 26 downwardly and moves it laterally through an arc of approximately 150° to turn the rotor clockwise from the softening position of Fig. 6 to the backwash position of Fig. 7, and then after the backwash operation, he forces the lever 26 downwardly again and moves it laterally in a counter-clockwise direction through approximately 80° from the backwash position to the brining position of Fig. 8, and finally turns the rotor back to service position.

Figs. 9 to 13 illustrate a modified or alternative construction. The parts of this valve have been numbered to correspond to the parts of the other valve, the stator being 16a, the rotor 21a, and the intermediate plate 25a, etc. In this valve, the brine ejector is incorporated entirely in the plate 25a instead of in the rotor 21a, and this permits extension of the stem 20a through the center of the rotor for direct engagement with the plate 25a to unseat the same. A cross-pin 23a slidable in a diametrical slot 22a in the rotor 21a provides a sliding driving connection between the stem and rotor, so that the intermediate plate 25a can be unseated by depression of the stem 20a with the lever 26a, and then the rotor 21a can be turned by lateral movement of the lever 26a. The stem has a swivel connection with the plate 25a, as indicated at 110, to permit lifting the plate and positively seating it on the rotor 21a by means of the hand lever 26a. A screw 111 threaded in the hand lever and engaging the top of the housing 17a serves to hold the lever raised with the plate 25a seated and the tubular seals 58a and 84a compressed to the desired degree so as to minimize danger of leakage. Springs 30a are shown to assist in seating the plate 25a, but, of course, these may be eliminated where the screw 111 is provided, and vice versa. The tubular rubber seals 58a correspond to the seals 58 of Fig. 1, but the tubular seals 61a and 83a differ from the seals 61 and 83, respectively, in being of molded rubber to form bellows having annular hollow ribs 89 which permit easier endwise compression of the seals 61a and 83a with less strain imposed thereon. Hence these molded bellows should last much longer than the plain tubular seals shown in Fig. 1.

Figure 9:
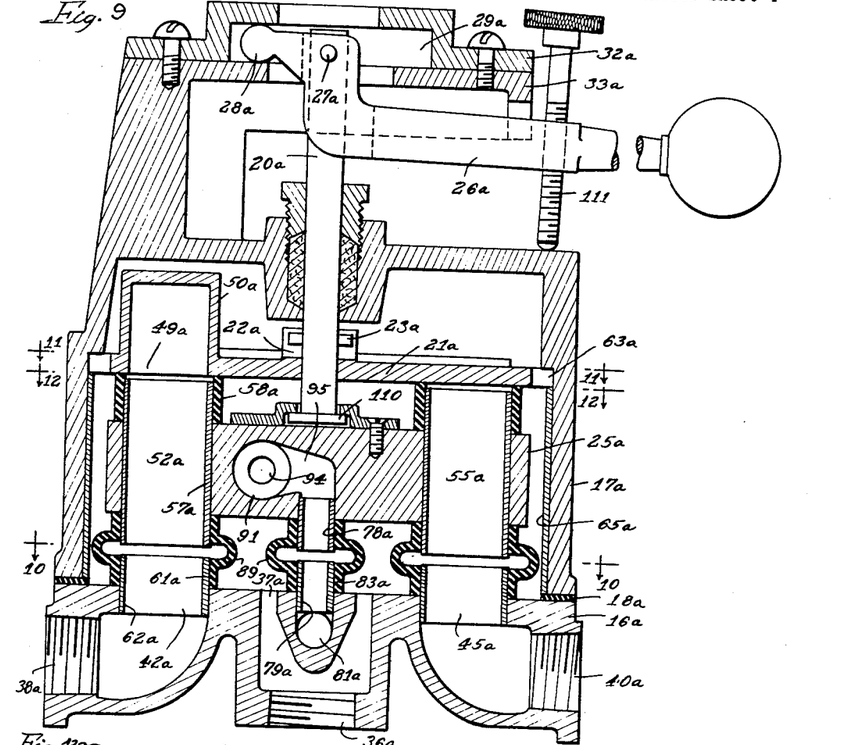
Figs. 9 to 13 are views corresponding to Figs. 1 to 5, respectively, showing a valve of modified or alternative construction, Fig. 9 being a vertical section on the line 9—9 of Fig. 10, Fig. 10 being a cross-section on the line 10—10 of Fig. 9, Figs 11 and 12 being top views of the rotor and intermediate plate, respectively, taken on the correspondingly numbered lines of Fig. 9, and Fig. 13 being a fragmentary vertical section with the stator and intermediate plate in section on the line 13—13 of Fig. 12 and with the rotor in brining position.
Figures 10, 11, 12:
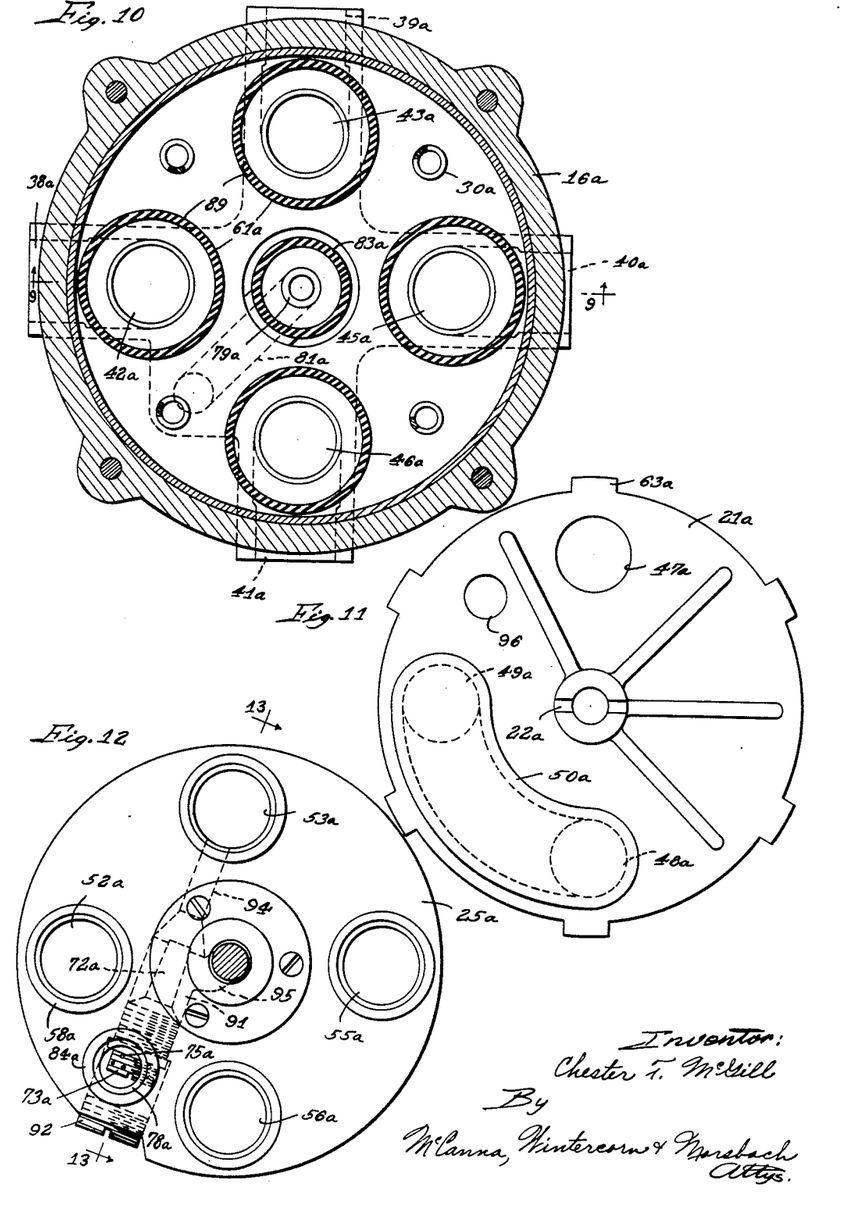
Figure 13:
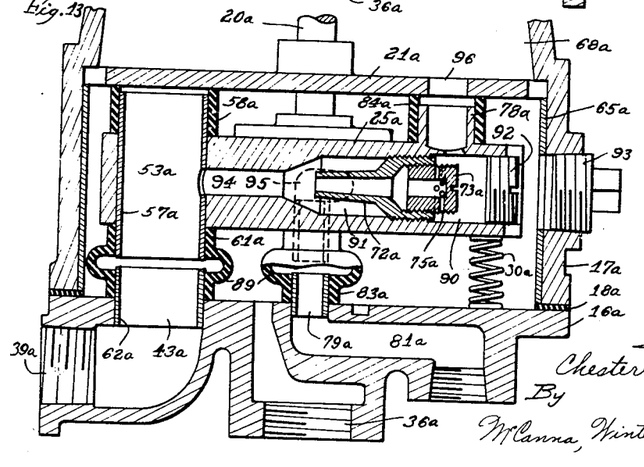

The brine ejector comprises a nozzle 72a threaded in a horizontal hole 90 in the intermediate plate 25a and projecting into the chamber 91 to which brine is delivered from the passage 81a that communicates with the brine tank. The adjustable jet 73a threads into the nozzle 72a and discharges water through the nozzle at a rate depending upon the number of holes 75a left uncovered. A plug 92 closing the hole 90 is removable upon removal of a plug 93 from an opening in the wall of the housing 17a in register with the plug 92, and one may therefore adjust the jet 73a from the outside of the valve to increase or decrease the amount of water delivered with the brine to the softener. The water discharged from the nozzle 72a passes through the hole 94 into the port 53a communicating with the stator port 43a that is connected with the top of the softener tank similarly as the port 43 in Fig. 8, whereby to deliver brine into the top of the softener tank, the brine being entrained with the water from the nozzle chamber 91. Fig. 9 illustrates the direct communication between the brine passage 81a in the stator and the nozzle chamber 91 in the intermediate plate 25a through a passage 95 in the plate 25a communicating with the nipple 78a. Water is supplied to the jet 73a from the chamber 68a above the rotor 21a through a port 96 which registers with the neck 78a on the intermediate plate 25a only when the rotor is turned to brining position. The hole 90 in the plate 25a communicates with the neck 78a, as shown in Fig. 13. The operation of this valve of Figs. 9 to 13 is so closely similar to the valve of Figs. 1 to 5 that no additional description seems necessary in view of the foregoing.

Figures 14, 16:
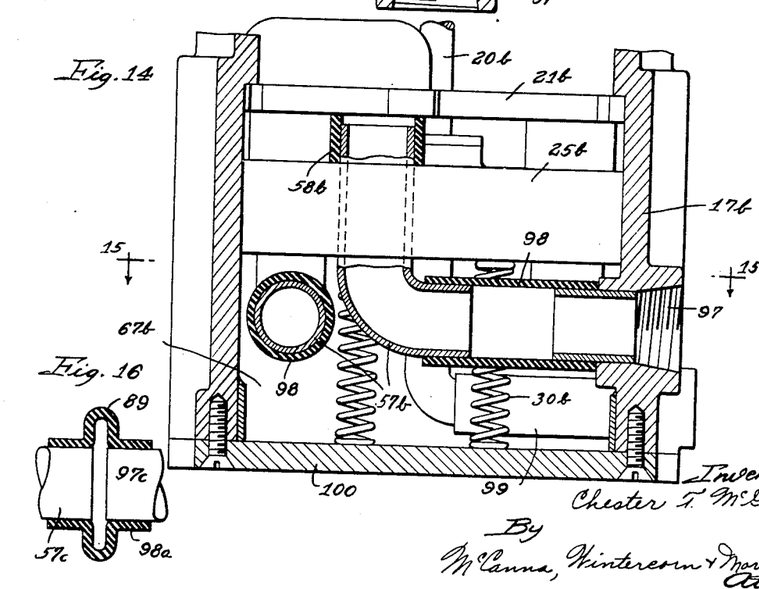
Fig. 14 is a fragmentary vertical section on the line 14—14 of Fig. 15, showing still another modified or alternative construction.
Fig. 16 is a sectional detail of a further modification.

The valve shown in Fig. 14 is similar to the valve of Figs. 9 to 13, and corresponding parts have been numbered correspondingly, the rotor being 21b and the intermediate plate being 25b and the housing 17b. The stator is eliminated in this design, pipe connections 97 being provided in the side wall of the housing 17b to take the place of the hollow radial bosses on the stator to which the pipes connected to the water supply, service system, softener, brine tank, and waste are connected, the connections 97 being placed in communication with elbows 57b substituted for the bushings 57 or 57a of the other valves. In the present design, flexible rubber hose connections 98 establish communication between the pipe connections 97 and the elbows 57b and a smaller flexible rubber hose connection 99 being provided for the brine connection. The same sort of tubular rubber seals 58b are provided between the rotor 21b and the intermediate plate 25b, as in Figs. 1 and 9. A cover plate 100 seals the bottom of the housing 17b, and, of course, one of the pipe connections 97' will open directly into the chamber 67b to deliver raw water thereto from the raw water supply pipe.

Figure 15:
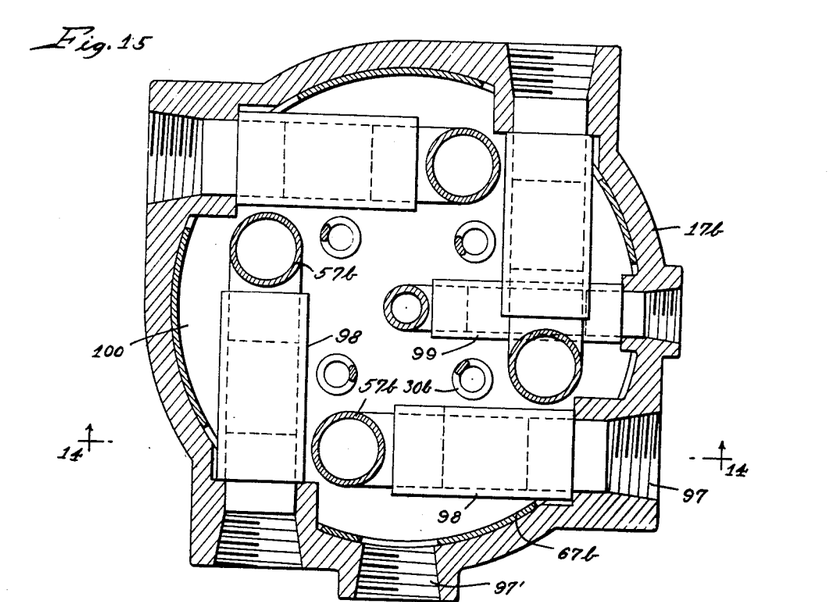
Fig. 15 is a horizontal section on the line 15—15 of Fig. 14.

In the operation of a valve of this construction, it is obvious that the plate 25b can be seated and unseated by movement of the stem 20b similarly as in the valve of Figs. 9 to 13, whereupon the rotor 21b can be turned by means of the stem to another operating position. Due to the length of the hose connections 98 and 99, it is obvious that there will be no strain whatever imposed upon these connections in the unseating and seating of the plate 25b. The springs indicated in Fig. 15 at 30b, acting between the cover plate 100 and the bottom of the intermediate plate 25b, tend normally to keep the plate seated with just sufficient compression of the seals 58b and 84b to prevent leakage, but, of course, these may be omitted, if desired, if the hand lever operating the stem 20b is equipped with a screw like the screw shown at 111 in Fig. 9. A valve of this design may, of course, have the brine ejector nozzle embodied in the plate 25b similarly as shown in Fig. 13.

Where, as shown in Fig. 16, the elbows 57c are elongated so as to reach close to the inner ends of the nipples 97c in the pipe connections 97, I contemplate using molded rubber flexible bellows connections 98a having the same hollow annular ribs 89 as described in Figs. 9 to 13. The operation of such a valve would, of course, be practically the same as the operation of the valve of Fig. 14, the bellows connections 98a being flexible sufficiently to permit easy unseating of the intermediate plate from the rotor.

It is believed the foregoing description conveys a good understanding of the objects and advantages of my invention. The appended claims are drawn with a view to covering all legitimate modifications and adaptations.

I claim:

1. In a plate type valve, a ported body member, a ported plate member, a ported intermediate member the ports of which register with the ports in the body member, flexible tubular sealing means between the body member and intermediate member establishing communication between the registering ports, other flexible tubular sealing means between the intermediate member and plate member for establishing communication between ports in the plate member brought into register with ports in the intermediate member, and means for moving the plate member from one position to another.

2. In a plate type valve, a ported body member, a ported plate member, a ported intermediate member the ports of which register with the ports in the body member, tubular means projecting from the intermediate member concentric with the ports thereof toward the plate and body members, other tubular means on the body member concentric with the ports thereof and projecting toward the tubular means on the intermediate member, flexible tubular seals in fluid tight telescoping relation with said tubular means between the intermediate member and body member, other flexible tubular seals in fluid tight telescoping relation with the tubular means on the intermediate member arranged to engage the plate member to establish fluid tight communication between ports in the plate members and registering ports in the intermediate member, and means moving the plate member from one position to another.

3. A valve as set forth in claim 2, wherein the plate member and intermediate member are adapted to be unseated relative to one another, and the tubular means on the body member and intermediate member are disposed in spaced relation to one another when said intermediate member is seated on the plate member, said tubular means being adapted to come into engagement with one another to positively limit unseating movement of the intermediate member.

4. A valve as set forth in claim 2, wherein the first mentioned flexible tubular sealing means are in telescoping relation with the outside of the tubular means between the body member and intermediate member and are constructed to provide a bellows portion intermediate the ends thereof readily collapsible and expansible axially.

5. In a plate type valve, the combination of a ported body member, a housing thereon providing an annular bearing therein, a ported plate rotatably mounted in said bearing, an intermediate plate movable axially toward and away from the first plate between the body member and the first plate, said intermediate plate having ports provided therein registering with ports in the body member, tubular means concentric with the ports in the intermediate plate projecting toward the body member and rotary plate, other tubular means concentric with the ports in the body member projecting toward the intermediate plate in concentric relation with the last mentioned tubular means, flexible tubular seals in fluid tight telescoping relation with said tubular means between the intermediate plate and body member establishing communication between the ports in said plate and body member, other flexible tubular seals in fluid tight telescoping relation with the tubular means on the intermediate plate adapted to engage the rotary plate to effect communication between the ports of said plates, and means for unseating the intermediate plate, turning the rotary plate from one position to another, and reseating the intermediate plate.

6. In a plate type valve, the combination of a ported body member, a housing thereon providing an annular bearing therein, a ported plate rotatably mounted in said bearing, an intermediate plate movable axially toward and away from the first plate between the body member and the first plate, said intermediate plate having ports provided therein registering with ports in the body member, tubular sealing means between the body member and intermediate plate establishing communication between the ports thereof, other tubular sealing means between the intermediate plate and the rotary plate establishing communication between ports in the rotary plate registering with ports in the intermediate plate, an operating stem reciprocable and rotatable with respect to said housing having a swivel engagement with the intermediate plate and slidable driving connection with the rotary plate to permit unseating the intermediate plate, turning the rotary plate with respect thereto from one position to another, and reseating the intermediate plate, and manually operable means for reciprocating and rotating said stem, including a hand lever pivotally connected with the stem at one point and slidably engaging an abutment stationary with respect to the housing, and means acting between the lever and another abutment stationary with respect to the housing for holding the intermediate plate seated with the second named sealing means in tight engagement with the rotary plate.

7. In a plate type valve, the combination of a housing providing an annular bearing therein, a rotary ported plate rotatably mounted in said bearing, a closure plate on said housing in spaced relation to the rotary plate, said housing having ports provided in the walls thereof and located between the closure plate and rotary plate, an intermediate ported plate disposed between the ports in the walls of said housing and the rotary plate and substantially parallel to the latter, flexible tubular sealing means establishing communication between the housing ports and the ports in the intermediate plate permitting axial movement of the intermediate plate, tubular sealing means between the intermediate plate and rotary plate to establish communication between the ports in the rotary plate registering with ports in the intermediate plate, and means for relieving seating pressure between the rotary plate and the intermediate plate and turning the rotary plate.

8. In a plate type valve, the combination of a housing providing an annular bearing therein, a rotary ported plate rotatably mounted in said bearing, a closure plate in said housing in spaced relation to the rotary plate, said housing having ports provided in the walls thereof and located between the closure plate and rotary plate, an intermediate ported plate disposed between the ports in the walls of said housing and the rotary plate and substantially parallel to the latter, elbow projections concentric with the ports in the intermediate plate extending toward the housing ports, flexible tubular seals in fluid tight telescoping relation with said elbows establishing communication between the ports in the intermediate plate and the housing ports, tubular means in concentric relation with the ports in the intermediate plate projecting from the intermediate plate toward the rotary plate, tubular seals in fluid tight telescoping relation with said tubular means adapted to engage the rotary plate to effect fluid tight communication between the ports in the latter registered with ports in the intermediate plate, and means for relieving seating pressure between the rotary plate and the intermediate plate and turning the rotary plate.

9. A valve as set forth in claim 7, wherein the flexible tubular sealing means comprises tubular members each of which has an annular hollow rib formation intermediate the ends thereof affording increased flexibility and permitting easier compression and expansion.

10. A valve as set forth in claim 8, wherein each of the first mentioned tubular seals has an annular hollow rib formation intermediate the ends thereof affording increased flexibility and permitting easier compression and expansion.

11. In a plate type valve, the combination of a ported body member having a central port and a series of circumferentially spaced ports therearound, a housing on said body member providing an annular bearing therein, a rotary plate rotatably mounted in said bearing having a central port provided therein in register with the central port in the body member and one or more other ports adapted to register with the other ports in the body member together with still another port in radially spaced relation to the central port and communicating therewith through a passage provided in the rotary plate, an ejector nozzle in said radially spaced port, and a jet carried on the rotary plate communicating with the inside of the housing and discharging into said ejector nozzle, means for supplying fluid under pressure to said housing, means for supplying fluid to the central port of the body member, a ported intermediate plate having a central port registering with the aforesaid central ports in the body member and rotary plate, said intermediate plate also having circumferentially spaced ports registering with the circumferentially spaced ports in the body member and adapted also to register with ports in the rotary plate including the radially spaced port containing the ejector nozzle, tubular sealing means between the body member and intermediate plate to effect sealed communication between their registering ports, other tubular sealing means between the intermediate plate and rotary plate to effect sealed communication between their registering ports, and means for relieving seating pressure between the rotary plate and the intermediate plate and turning the rotary plate from one position to another.

12. In a plate type valve, the combination of a ported body member having a central port and a plurality of circumferentially spaced ports therearound, a housing on said body member providing an annular bearing therein, a rotary plate rotatably mounted in said bearing having circumferentially spaced ports adapted to register with the circumferentially spaced ports in the body member, means for supplying fluid under pressure to the housing, means for supplying fluid to the central port in said body member, an intermediate plate having circumferentially spaced ports registering with the circumferentially spaced ports in the body member and also a central port registering with the central port in the body member, tubular sealing means for effecting sealed communication between the registering central and circumferentially spaced ports of the body member and intermediate plate, respectively, other tubular sealing means for effecting sealed communication between the circumferentially spaced ports in the intermediate plate and the circumferentially spaced ports in the rotary plate registering therewith, means for relieving seating pressure between the rotary and the intermediate plate and turning the rotary plate from one position to another, said intermediate plate having a nozzle chamber provided therein extending substantially diametrically in said plate from one of the circumferentially spaced ports to another and communicating through a radial opening intermediate its ends with the central port, an ejector nozzle discharging from one of said circumferentially spaced ports into said chamber toward the other of said ports transversely with relation to the aforesaid radial opening, and a jet arranged to be supplied with fluid under pressure from the first of the last two mentioned circumferentially spaced ports and discharging into the ejector nozzle.

13. A valve as set forth in claim 12, wherein said jet is threadedly adjustable with respect to the ejector nozzle so as to uncover more or less of a plurality of radial holes provided in said jet to vary the amount of fluid discharged into the ejector nozzle, said valve including a plug removably mounted in the end of the nozzle chamber which when removed affords access to the jet for adjustment thereof from outside the intermediate plate, and a removable closure on the housing closing an opening provided in the housing wall in register with and adjacent the plug to permit removal of said plug from outside the housing and adjustment of the jet.

14. In a plate type valve, a ported body member, a ported plate member, and a ported intermediate member adapted to establish communication through the ports thereof between the ports in the plate and body members in different positions of relative adjustment of said plate and body members, said body member having projecting neck portions around the ports thereof and said intermediate member having projecting neck portions around the ports thereof extending toward the first-named neck portions, flexible tubular sealing members fitting on said neck portions, the construction permitting axial movement of the intermediate member to seat and unseat the intermediate member relative to said plate member, and means for relieving seating pressure between the intermediate member and said plate member and changing the relationship between the plate and body members.

15. In a plate type valve, a ported body member, a ported plate member, and a ported intermediate member adapted to establish communication through the ports thereof between the ports in the plate and body members in different positions of relative adjustment of said plate and body members, said body member having projecting neck portions around the ports thereof and said intermediate member having projecting neck portions around the ports thereof extending toward the first-named neck portions, flexible tubular sealing members fitting on said neck portions, the construction permitting axial movement of the intermediate member to seat and unseat the intermediate member relative to said plate member, sealing means compressible between the intermediate member and said plate member, and means for unseating the intermediate member from said plate member and changing the relationship between the plate and body members and reseating the intermediate member.

16. In a plate type valve, a ported body member, a ported plate member, and a ported intermediate member adapted to establish communication through the ports thereof between the ports in the plate and body members in different positions of relative adjustment of said plate and body members, flexible tubular sealing means between the intermediate member and body member establishing communication between registering ports thereof, sealing means compressible between the intermediate member and said plate member, spring means normally urging the intermediate member toward seating, and means for relieving said seating pressure and changing the relationship between the plate and body members.

17. In a plate type valve, a ported body member, a ported plate member, a ported intermediate member the ports of which register with the ports in the body member, flexible tubular sealing means between the body member and intermediate member establishing communication between the registering ports, other flexible tubular sealing means between the intermediate member and plate member for establishing communication between ports in the plate member brought into register with ports in the intermediate member, at least one of the two sets of flexible tubular sealing means having the tubular members thereof constructed to provide bellows portions intermediate the ends thereof readily collapsible and expansible axially, and means for relieving seating pressure between the intermediate member and the plate member and moving the plate member from one position to another.

18. In a multiport valve, the combination of a ported body member, a ported plate member and a ported intermediate member the ports of which communicate with ports in the body member, flexible tubular means interconnecting the ports in the body member and the ports in the intermediate member, sealing means compressible between the intermediate member and said plate member, a fluid-tight housing on the body member enclosing said plate member and intermediate member, spring means normally urging the intermediate member toward the plate member to maintain communication between the ports in the intermediate member and ports in the plate member in different positions of rotary adjustment of the latter, an operating stem rotatable and reciprocable through an opening provided in the housing and having a sliding driving connection with the plate member and having abutment with the intermediate member, and manually operable means associated with the outer end of said stem for reciprocating and rotating the same.

19. In a plate type valve, the combination of a housing, a rotary ported plate therein, a closure plate on said housing in spaced relation to the rotary plate, said housing having ports provided in the walls thereof and located between the closure plate and rotary plate, an intermediate ported plate disposed between the ports in the walls of said housing and the rotary plate and substantially parallel to the latter, flexible tubular sealing means establishing communication between the housing ports and the ports in the intermediate plate permitting axial movement of the intermediate plate relative to the rotary plate to seat and unseat said intermediate plate, and means for unseating the intermediate plate, turning the rotary plate, and reseating the intermediate plate.

20. In a plate type valve, the combination of a housing, a rotary ported plate therein, a closure plate on said housing in spaced relation to the rotary plate, said housing having ports provided in the walls thereof and located between the closure plate and rotary plate, an intermediate ported plate disposed between the ports in the walls of said housing and the rotary plate and substantially parallel to the latter, elbow projections extending from the ports in the intermediate plate toward the housing ports, flexible tubular seals in fluid-tight telescoping relation with said elbows and extending to the housing ports, and means for unseating the intermediate plate, turning the rotary plate, and reseating the intermediate plate.

CHESTER T. McGILL.